K. KUHLMANN.
CIRCUIT BREAKER.
APPLICATION FILED AUG. 16, 1907.
918,681.
Patented Apr. 20, 1909.
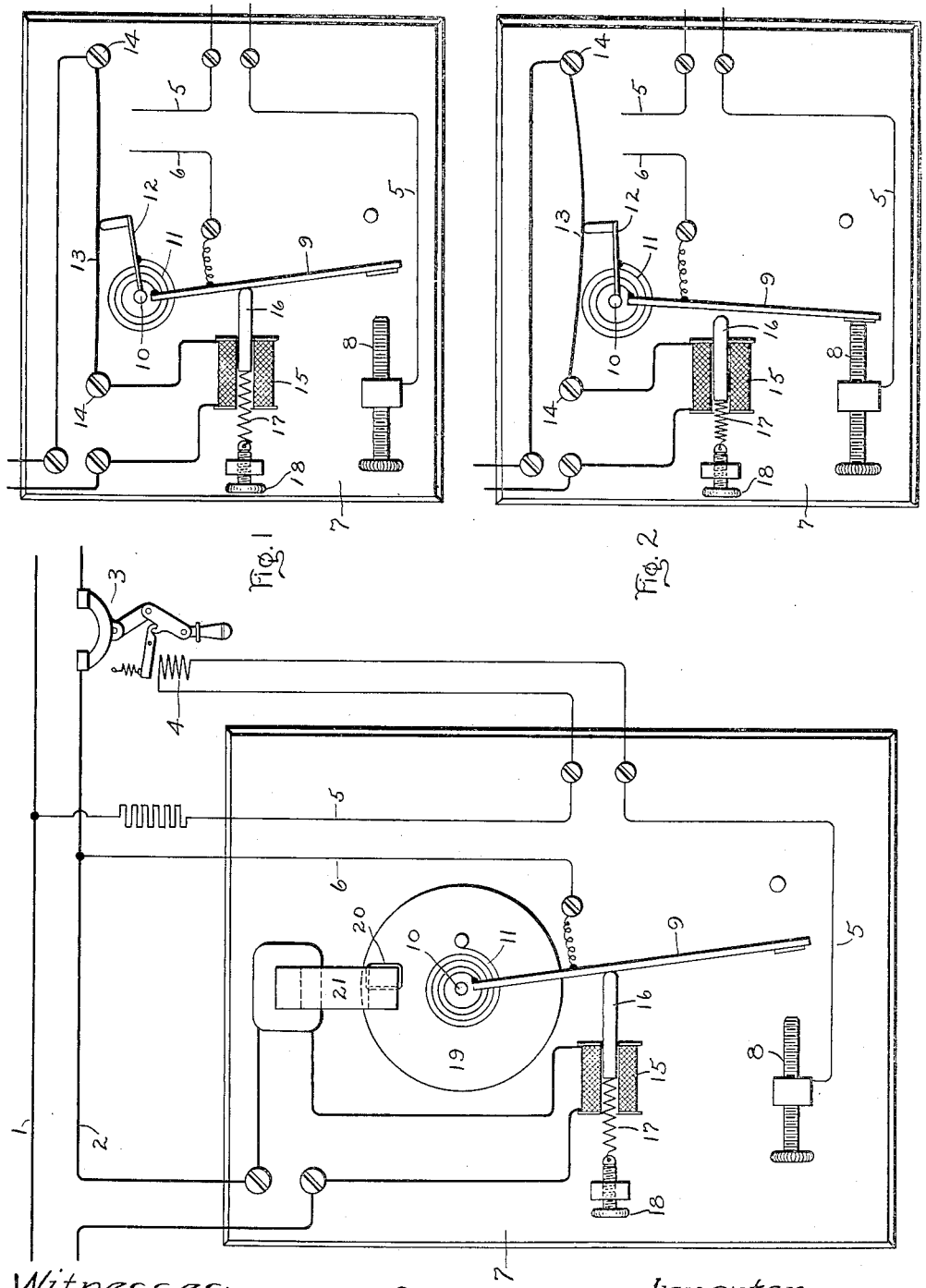
Witnesses:
J. Earl Ryan
J. Elbi Ylm.
Inventor
Karl Kuhlmann
By [signature]
Att'y.

UNITED STATES PATENT OFFICE.

KARL KUHLMANN, OF BERLIN-PANKOW, GERMANY, ASSIGNOR TO GENERAL ELECTRIC COMPANY, A CORPORATION OF NEW YORK.

CIRCUIT-BREAKER.

No. 918,681.  Specification of Letters Patent.  Patented April 20, 1909.

Application filed August 16, 1907. Serial No. 388,849.

*To all whom it may concern:*

Be it known that I, KARL KUHLMANN, a subject of the Emperor of Germany, residing at Berlin-Pankow, Germany, have invented certain new and useful Improvements in Circuit-Breakers, of which the following is a specification.

This invention relates to circuit controlling devices and more particularly to automatic devices actuated only by an abnormal current which persists for a predetermined length of time.

A thermostatic device such as a hot wire connected in the circuit is a simple and effective means for securing a time lag in the operation of an automatic circuit controller and is unaffected by changes in the frequency or in the wave form of the current, but as heretofore applied to circuit controllers the circuit could not be closed until the thermostatic device had cooled down to its normal temperature. Difficulties were also encountered where a circuit must be opened if the current exceeds the normal but only a small amount, since a thermostatic device when heated expands rapidly at first and continues to expand at a constantly decreasing rate, so that it reaches its complete elongation only after a very considerable length of time. If the thermostat is arranged so that its rapid expansion trips the circuit-breaker within a reasonable length of time when a current 10 per cent. greater than the normal flows in the circuit, a long continued current very slightly greater than normal will in time cause the thermostatic device to expand enough to trip the breaker.

The object of my invention is to provide a simple and effective circuit-controlling device which will have a time lag and which can be reset immediately after tripping; in which the tripping means can affect the breaker only during the time the current exceeds a predetermined limit; in which the time lag of the circuit controlling device depends on the amount and duration of the current flowing in the circuit for a short time prior to the operation of said device; and in general to improve the construction and operation of thermostatic tripping devices for circuit-breakers.

In carrying out my invention a controlling member for the circuit is arranged to respond with a predetermined time lag to variations of current in the circuit, and this controlling member is normally locked in an inoperative position by a device which permits said member to control the circuit only during the time the current in the circuit is in excess of a predetermined limit. The restraining device is preferably controlled by an electromagnet or similar arrangement which will respond more quickly than the controlling member to the current in the circuit so that while the current is abnormal the restraint upon the controlling member is removed and the controlling member is free to control the circuit. In the preferred form of my invention the circuit-controller has a time lag secured by means of a thermostatic device connected in the circuit, and the time lag is altered in accordance with the amount and duration of current flowing for a short time prior to the operation of the circuit controller by causing the movements of the thermostatic device in response to said current to store energy by any suitable means, and by causing the stored energy to affect the circuit controller the instant the current in the circuit becomes abnormal. The preferred form of energy storing device consists of a spring interposed between the thermostatic actuating device and the circuit controller and which is not strong enough to move the circuit controller unless the restraining device is rendered ineffective by abnormal current.

My invention will best be understood in connection with the accompanying drawing which is merely an illustration of one form in which my invention may be embodied, and in which—

Figure 1 shows a thermostatic relay as it appears when the current is normal; Fig. 2 the same device when the current is abnormal; and Fig. 3 a similar device in which the thermostat is replaced by a form of actuating device responsive to alternating current.

In the arrangement shown in the drawing the leads of the main circuit to be controlled are marked 1 and 2, and a circuit-breaker 3 interposed in one of the leads enables the circuit to be opened. The circuit-breaker 3 may be of any desired form and may be tripped in any well-known manner, but the arrangement which I have shown comprises a trip coil 4 connected to the leads 1 and 2 by means of trip circuit leads 5 and 6, by means of which the circuit through the trip coil 4 may be closed to cause the circuit-breaker to open.

My invention is shown in the drawings as embodied in a relay mounted upon a base-plate 7 of any suitable material and controlling the circuit through the trip coil 4 of the breaker 3, although if the relay were made large enough it could be used to control the circuit directly. One lead 5 of the trip circuit is connected to a fixed contact 8 of the relay, while the other lead 6 of the trip circuit is connected to a circuit controller or movable contact arm 9 pivotally mounted on a suitable pin 10 carried by the base-plate 7 and coöperating with the fixed contact 8 to control the circuit of the trip coil 4 and thereby control the main circuit. The movable contact arm 9 is connected to a means for storing energy which is shown in the drawing as a spiral spring 11 with one end connected to the contact arm 9 and the other end connected to an operating arm 12 mounted upon the pin 10 and having its free end in engagement with an actuating mechanism having a time lag and responsive to current in the main circuit. The mechanism as shown is a thermostatic device or strip 13 supported at each end by posts 14 carried on the base-plate 7. The thermostatic strip 13 is connected in series with the circuit to be controlled and the operating arm 12, the movable contact 9 and the strip 13 form in effect a controlling member for the circuit or, in conjunction with the coil 4, a tripping means movable with a predetermined time lag in response to variations of current for the purpose of controlling the circuit.

The position of the movable contact arm 9 is determined by a restraining means or stop sufficiently powerful to hold it immovable against the action of the thermostatic strip 13. The restraining means may be of any suitable kind, but the preferred form which I have shown consists of the solenoid 15 having a core 16 for engaging the contact arm 9 to act as a stop for said arm. The core 16 is normally held in the position shown in Fig. 1 to lock the arm 9 immovable by means of a spring 17 powerful enough to overcome the spring 11 and hold the contact arm 9 stationary regardless of the position of the strip 13. The solenoid 15 is connected in series with the circuit to be controlled and is so proportioned that when the current in the circuit reaches a predetermined limit the core 16 is drawn out of engagement with the contact arm 9, which is thereupon left free to move under the influence of the strip 13 and the energy storing device 11. The tension of the spring 17 may be varied to alter the amount of current at which the contact arm 9 is released by means of a calibrating screw 18 mounted in a suitable support on the base-plate 7.

Various types of actuating mechanism may be substituted for the thermostatic strip 13 and one of such mechanisms which I may use for alternating currents is shown in Fig. 3. This mechanism comprises a disk 19 connected to the contact arm 9 through a spring 11 and provided with a short circuited coil 20 which as shown in Fig. 3 is normally partly between the poles of a magnet 21 having U-shaped poles, one on each side of the disk, and with its winding connected in series with the circuit to be controlled.

The time lag of the circuit controlling device depends upon the rate of expansion of the strip 13. If a current great enough to withdraw the core 16 suddenly flows in the circuit, the time which elapses before the trip circuit is closed depends entirely upon the amount of current, as the strip can expand and move the arm 9 unhindered and at a rate determined by the amount of the current. If a current slightly greater than normal, but not great enough to withdraw the stop, flows for some time, the strip 13 bows up a certain extent in response to said current, thereby storing energy in the spring 11. If the core is withdrawn while the strip 13 is bowed, the arm 9 moves quickly to a point where the stored energy of the spring 11 is exhausted, and the time lag of the device under these circumstances depends on the time required for the arm 9 to move on from said point into engagement with the fixed contact 8. This time evidently depends upon the position of the point to which the arm is moved by the spring, which in turn depends upon the extent to which the strip 13 was bowed by the slight abnormal current. The time lag of the device, therefore, varies with the amount and duration of current flowing for a short time preceding the withdrawal of the core 16.

The operation of the device is as follows: When the current is normal, the parts are in the position shown in Fig. 1; if the current increases very slightly above normal the strip 13 begins to bow up into the form shown in Fig. 2 and in so doing moves the operating arm 12 about the pivot 10 thereby straining the spring 11 and storing energy therein. This movement has no effect on the contact arm 9 which is held immovable by the core 16 of the solenoid 15. As the current continues to increase a point is reached at which the solenoid 15 withdraws the core 16, thereby leaving the contact arm 9 free to move. The energy stored in the spring 11 causes the arm 9 to move a distance depending upon the extent to which the strip 13 had bowed up before the stop was removed, and from that point on until the contact arm 9 engages the fixed contact 8 the rate of movement of the contact arm is determined by the rate of expansion of the strip 13. If the current drops down to normal before the contact arm 9 reaches the fixed contact 8, the solenoid 15 releases the core 16, which is then forced out by the spring 17 and forcibly returns the contact arm 9 to its normal inoperative position. If the contact arm 9 moves into engagement with the fixed contact 8, the circuit through the trip coil 4 is closed and the main circuit is opened. The instant the current in the main circuit ceases to flow the core 16 is thrust out by the action of the spring 17 and throws the contact arm 9 out of engagement with the fixed contact 8 and back into normal or inoperative position, thereby opening the circuit of the trip coil 4. The circuit-breaker 3 can then be immediately closed and will remain closed if the current in the circuit is normal.

My invention may be embodied in many other forms than that shown and described, and I therefore do not wish to be restricted to the form shown but intend to cover by the appended claims all changes and modifications which are within the spirit and scope of my invention.

What I claim as new and desire to secure by Letters Patent of the United States, is:—

1. In a circuit controlling device, the combination with a controlling member movable with a time lag in response to variations of current to control the circuit, of a restraining device for preventing movement of said controlling member when said device is in normal position and means responsive to abnormal current of predetermined amount whereby said device is moved from normal position and said member is released from restraint during abnormal current.

2. In a circuit controlling device, the combination with a controlling member movable with a time lag in response to variations of current to control the circuit and capable of being forcibly moved to inoperative position, of means for forcibly moving said member to inoperative position when the current is normal and actuated by abnormal current to release said member.

3. In a circuit controlling device, the combination with a controlling member movable with a time lag in response to variations of current to control the circuit and capable of being forcibly moved to inoperative position, of a spring-pressed member for forcibly moving said member to inoperative position, and electromagnetic means responsive to current for controlling said member.

4. The combination with a circuit controller, of actuating means for said controller responsive with a time lag to abnormal current in the circuit, a restraining member for normally preventing actuation of said controller and means responsive to abnormal current of predetermined amount whereby said member is moved into ineffective position and said controller is left free to be actuated during abnormal current.

5. In a circuit-breaker, the combination with tripping means responsive with a time lag to abnormal current in the circuit, of restraining means for normally holding said tripping means in inoperative position, said restraining means being adapted to release the tripping means upon the occurrence of abnormal current of predetermined amount.

6. In a circuit-breaker, the combination with tripping means responsive with a time lag to abnormal current in the circuit, of a stop for normally preventing the tripping of said circuit breaker, means for moving said stop to release said tripping means during abnormal current of predetermined amount, and means for varying the amount of current required to move said stop.

7. In a circuit-breaker, the combination with a controlling member, of actuating means for said member responsive with a predetermined time lag to abnormal current in the circuit and capable of being forcibly returned to inoperative position, and restraining means capable of forcibly returning said actuating means to inoperative position actuated by abnormal current of predetermined amount to release said actuating means.

8. The combination with a circuit-breaker, of tripping means responsive to abnormal current and requiring a predetermined time to move from normal to operative position, a stop for holding the tripping means in normal position, and means responsive to abnormal current of predetermined amount for moving the stop to release the tripping means.

9. The combination with a circuit-breaker, of tripping means responsive to abnormal current and requiring a predetermined time to move from normal to operative position, a stop for holding the tripping means in normal position, releasing means responsive to current of predetermined amount for moving the stop to release the tripping means, and means for varying the relation of said releasing means to the stop.

10. The combination with a circuit controlling member, of actuating mechanism for moving said member with a time lag in response to variations of current to control the circuit, a connection for permitting said mechanism and said member to move independently of each other to a predetermined extent, and restraining means for holding said member immovable when the current is normal.

11. The combination with a circuit controlling member, of actuating mechanism for moving said member with a time lag in response to variation of current to control the circuit, an energy storing connection between said mechanism and said member, and restraining means for holding said member immovable when the current is normal.

12. The combination with a circuit controlling member, of actuating mechanism for moving said member with a time lag in response to variation of current to control the circuit, a resilient connection between said mechanism and said member, a stop for holding said member immovable, and means responsive to abnormal current for moving said stop to release the member.

13. The combination with a circuit controlling member, of a thermostatic actuating mechanism for said member connected in series in the circuit, a resilient connection between the actuating mechanism and said member, a solenoid in series in the circuit, and a spring-pressed core for the solenoid in engagement with said member to overpower the resilient connection and hold said member inoperative when the current is normal.

14. The combination with a circuit controlling member, of actuating mechanism for moving said member with a time lag in response to variation of current to control the circuit, energy storing means for operating said member arranged to receive energy from said actuating mechanism, and restraining means for holding said member immovable while the current is normal.

In witness whereof, I have hereunto set my hand this 29th day of July, 1907.

KARL KUHLMANN.

Witnesses:
JULIUS RUMLAND,
OSKAR SINGER.